(12) United States Patent
Hindi et al.

(10) Patent No.: US 8,053,716 B1
(45) Date of Patent: Nov. 8, 2011

(54) METHOD AND APPARATUS FOR DETERMINING THE TIME AND LOCATION OF LIGHT FLASHES

(75) Inventors: Munther M. Hindi, Campbell, CA (US); Lee M. Klynn, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 198 days.

(21) Appl. No.: 12/464,853

(22) Filed: May 12, 2009

(51) Int. Cl.
*G01T 1/20* (2006.01)
*G01T 1/24* (2006.01)
*H01L 25/00* (2006.01)

(52) U.S. Cl. ............. 250/208.2; 250/370.1; 250/370.11; 348/316

(58) Field of Classification Search ............... 250/208.2, 250/370.01, 370.1, 370.11; 348/311, 316
See application file for complete search history.

(56) References Cited

U.S. PATENT DOCUMENTS

| | | | | |
|---|---|---|---|---|
| 4,472,741 A * | 9/1984 | Takatsu et al. | ................. | 348/323 |
| 4,539,596 A * | 9/1985 | Elabd | ............................ | 348/316 |
| 5,291,294 A * | 3/1994 | Hirota | ............................ | 348/316 |
| 6,285,029 B1 * | 9/2001 | Shahar et al. | ............ | 250/370.14 |
| 6,961,125 B2 * | 11/2005 | Rushbrooke et al. | ......... | 356/417 |
| 7,057,726 B2 * | 6/2006 | Rushbrooke et al. | ......... | 356/417 |
| 7,166,848 B2 * | 1/2007 | El-Hanany et al. | ...... | 250/370.09 |
| 7,208,740 B2 * | 4/2007 | El-Hanany et al. | ...... | 250/370.09 |
| 7,274,020 B1 | 9/2007 | Hindi et al. | | |
| 7,397,038 B2 * | 7/2008 | Persyk et al. | ............... | 250/370.1 |
| 7,465,938 B1 | 12/2008 | Hindi et al. | | |
| 7,501,616 B2 * | 3/2009 | Wiklof | .......................... | 250/234 |
| 7,518,117 B2 * | 4/2009 | Bryman | ..................... | 250/370.1 |
| 7,525,098 B2 * | 4/2009 | El-Hanany et al. | ......... | 250/370.1 |
| 7,645,997 B2 * | 1/2010 | Zhang et al. | ............... | 250/370.1 |
| 7,667,757 B2 * | 2/2010 | Ikeda | ............................. | 348/316 |
| 2002/0054230 A1 * | 5/2002 | Chen | ............................. | 348/316 |
| 2003/0193591 A1 * | 10/2003 | Miyahara | ..................... | 348/294 |
| 2005/0023474 A1 * | 2/2005 | Persyk et al. | ............... | 250/370.1 |
| 2005/0213099 A1 * | 9/2005 | Rushbrooke et al. | ......... | 356/417 |
| 2007/0272841 A1 * | 11/2007 | Wiklof | .......................... | 250/234 |
| 2008/0128631 A1 * | 6/2008 | Suhami | ..................... | 250/370.09 |
| 2009/0242779 A1 * | 10/2009 | De Godzinsky | ......... | 250/370.09 |
| 2010/0102240 A1 * | 4/2010 | Fukuchi et al. | ............ | 250/370.1 |

* cited by examiner

*Primary Examiner* — John Lee
(74) *Attorney, Agent, or Firm* — McDermott Will & Emery LLP

(57) ABSTRACT

An imaging system comprises a first charge-coupled device (CCD), a second CCD, and a processor. The first CCD is configured to receive one or more light flashes, record a first set of data based on the light flashes, shift the first set of data in a first direction, read out the first set of data, and read out continuously. The second CCD is configured to receive the one or more light flashes, record a second set of data based on the light flashes, shift the second set of data in a second direction opposite to the first direction, read out the second set of data, and read out continuously. The processor, coupled to the first CCD and second CCD, is configured to determine a time and a location of the one or more light flashes based on the first set of data and the second set of data.

20 Claims, 7 Drawing Sheets

METHOD AND APPARATUS FOR DETERMINING THE TIME AND LOCATION OF LIGHT FLASHES

CROSS-REFERENCES TO RELATED APPLICATIONS

This application is related to U.S. Pat. No. 7,274,020, entitled "GAMMA VECTOR CAMERA," filed on Jun. 15, 2004, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The subject technology generally relates to imaging and, in particular, relates to a method and apparatus for determining the time and location of light flashes.

BACKGROUND

Light flashes can come from, for example, lightning or scintillation. Scintillation is a flash of light produced by an ionization event in a material that is transparent to light. The process of scintillation is one of luminescence whereby light of a characteristic spectrum is emitted following the absorption of radiation. The emitted radiation may be less energetic than that absorbed. Scintillation is an inherent molecular property in conjugated and aromatic organic molecules and arises from the electronic structure of said molecules. Scintillation also occurs in many inorganic materials, including salts, gases, and liquids.

SUMMARY

According to one aspect of the subject technology, light flashes may be recorded by two continuously running charge-coupled devices (CCD) that scan in opposite directions. In one aspect of the subject technology, the two readout times for the same light flash from the two continuously running CCDs can be used to solve for the time and location of the light flash.

According to one aspect of the subject technology, an imaging system for determining the time and location of light flashes comprises a first charge-coupled device (CCD) configured to receive one or more light flashes and record a first set of data based on the one or more light flashes. The first CCD is also configured to shift the first set of data in a first direction and read out the first set of data. The first CCD is further configured to read out continuously.

The imaging system also comprises a second CCD configured to receive the one or more light flashes and record a second set of data based on the one or more light flashes. The second CCD is also configured to shift the second set of data in a second direction and read out the second set of data. The second CCD is further configured to read out continuously. The second direction is opposite in direction to the first direction. The imaging system also comprises a processor coupled to the first CCD and the second CCD. The processor is configured to determine a time and a location of the one or more light flashes based on the first set of data and the second set of data.

In another aspect of the subject technology, a method for determining the time and location of light flashes comprises receiving one or more light flashes with a first CCD. The first CCD is configured to read out continuously. The method also comprises receiving the one or more light flashes with a second CCD. The second CCD is configured to read out continuously. The method also comprises recording a first set of data based on the one or more light flashes and recording a second set of data based on the one or more light flashes. The method also comprises shifting the first set of data in a first direction and shifting the second set of data in a second direction. The second direction is opposite in direction to the first direction. The method also comprises reading out the first set of data and reading out the second set of data. The method also comprises determining a time and a location of the one or more light flashes based on the first set of data and the second set of data.

According to yet another aspect of the subject technology, an imaging system for determining the time and location of light flashes comprises a first CCD configured to receive one or more light flashes and record a first set of data based on the one or more light flashes. The first CCD is also configured to shift the first set of data in a first direction and read out the first set of data. The imaging system also comprises a second CCD configured to receive the one or more light flashes and record a second set of data based on the one or more light flashes. The second CCD is also configured to shift the second set of data in a second direction and read out the second set of data. The second direction is opposite in direction to the first direction. The imaging system also comprises a processor coupled to the first CCD and the second CCD. The processor is configured to determine a time and a location of the one or more light flashes based on the first set of data and the second set of data.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

DETAILED DESCRIPTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention.

Figure 1A:
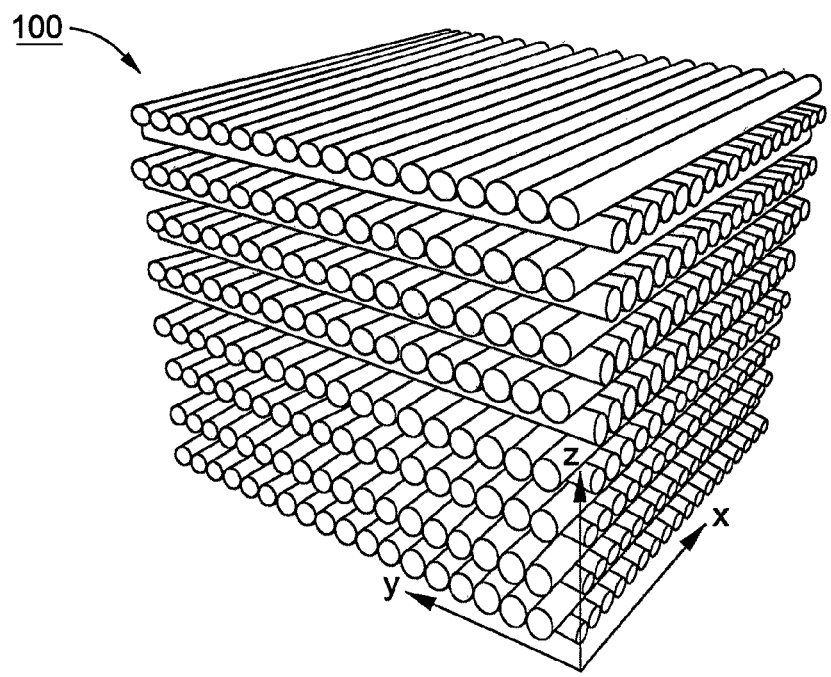
FIGS. 1A and 1B illustrate an example of an application for determining the time and location of light flashes, in accordance with one aspect of the subject technology.
Figure 1B:
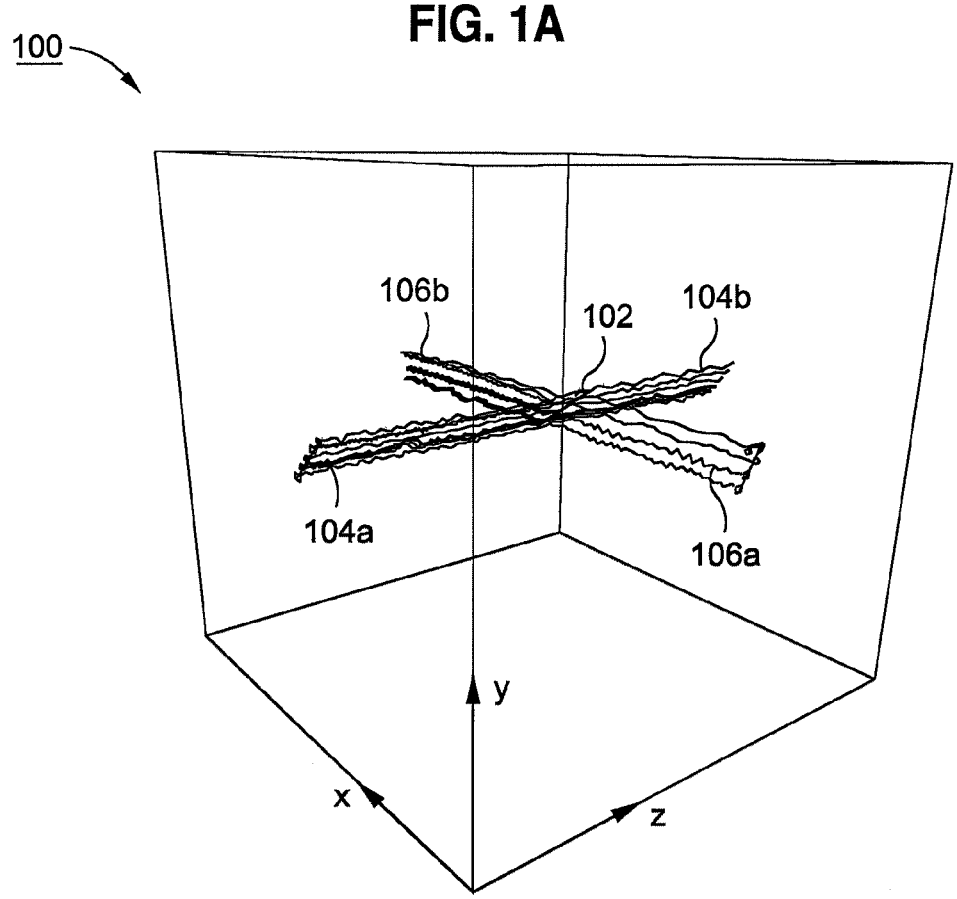

FIGS. 1A and 1B illustrate an example of an application for determining the time and location of light flashes, in accordance with one aspect of the subject technology.

Certain applications may require determining the time and location of a series of light flashes. For example, a sensor may be configured to detect radioactive sources, such as a sensor that can find the (unknown) direction from which gamma rays or x-rays are emanating. This sensor may be particularly useful in locating and tracking radioactive sources that could be present in a radiological weapon, such as a "dirty" bomb. The sensor may be a scintillation detector configured to monitor gamma or x-ray radiation, in which case the location of a light pulse (e.g., light flash) produced in the scintillator and its time of occurrence may need to be recorded. In one aspect of the subject technology, the time and location of the light flash may refer to the time the light flash is recorded by a detector, in addition to the location (e.g., pixel) on the detector upon which the light flash is recorded. The time may be used to correlate the event with light flashes resulting from the radioactive source.

The heart of the sensor may be an optical fiber cube, such as a block 100 of crossed scintillating optical fibers, or waveguides, as illustrated in FIG. 1A. For simplicity, the optical fibers may be referred to as fibers. The direction of a radiation particle, such as a gamma ray, that scatters twice in the block can be deduced from the position, direction and energy of the two recoil electrons. FIG. 1B illustrates a Monte Carlo simulation of the track of one such recoil electron (e.g., electron track 102), together with the light tracks of the optical photons generated through scintillation (e.g., light tracks 104a, 104b, 106a and 106b emanating from electron track 102 and traveling to the end of the fibers). Note that for clarity, the fibers are not shown in FIG. 1B.

Ideally, the light pattern (e.g., the group of light flashes corresponding to light track 104a, 104b, 106a, or 106b) generated by each gamma ray interaction with block 100 (e.g., one event) should be read out, or outputted, before another gamma ray interaction occurs. Otherwise, it may become difficult to tell which light tracks belong to which gamma ray interaction, and the reconstruction of the original gamma ray direction may fail. Alternatively, the time of production of each electron track 102 may have to be recorded (e.g., track time-stamping) and later used to group the light tracks that arose simultaneously (and hence came from the same gamma ray). Whether such event-by-event readout, or, alternatively, track time-stamping, is possible depends on the type of device used for photo sensing.

For the gamma ray energies of interest, the size of block 100 that may achieve a reasonable probability of double interactions is on the order of $10 \times 10 \times 10$ cm$^3$, in accordance with one aspect of the subject technology. However, other sizes may be possible for different applications. In one aspect, to allow good tracking of the electrons of the radioactive sources, the diameter (or side, for rectangular fibers) may be on the order of 25 μm; thus each face of block 100 may present about 4000×2000 fiber ends to read. Each fiber end may correspond to a pixel of a detector. Given the number of pixels required and the size of each pixel, an appropriate device to use for recording the light hits from each of the fiber ends is a CCD. However, one shortcoming of commercial off the shelf (COTS) CCDs is that they are not self-triggering, so the light flashes from the light tracks cannot be simply read on an event-by-event basis. Another shortcoming is that COTS CCDs are not capable of recording the time of arrival of light flashes at each pixel of the CCD for later retrieval.

According to one approach, a CCD may be externally triggered. However, this may either limit the rate of recording each event to the CCD frame rate (probably no better than about 30-60 frames per second for the required CCD sizes), or require specialty sensors and electronics. Other approaches involve using high frame rate CCDs with continuous readout or using non CCD light sensing devices. In accordance with one aspect of the subject technology, a readout scheme is provided which enables time-stamping of the light tracks and thus may allow recording on the order of 100 events per CCD frame. In one aspect, a much higher throughput rate is provided, while other approaches may not achieve such high throughput rates, do not have the position resolution of a CCD, or may require highly specialized (and hence more expensive) devices and readout electronics.

Figure 2:
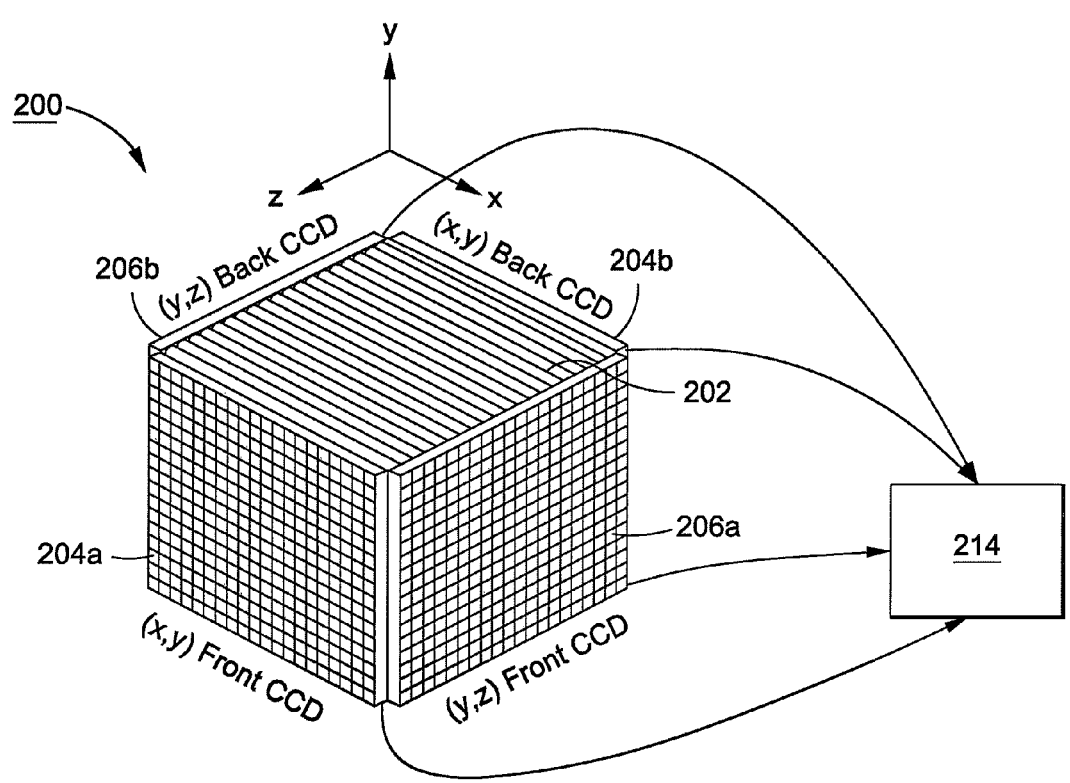
FIG. 2 illustrates an example of an imaging system for determining the time and location of light flashes, in accordance with one aspect of the subject technology.

FIG. 2 illustrates an example of an imaging system 200 for determining the time and location of light flashes, in accordance with one aspect of the subject technology.

In accordance with one aspect of the subject technology, two CCDs (a front one and a back one) may be used to record the light produced along a fiber, with one CCD placed at each end of the fiber, as shown in FIG. 2. Note that FIG. 2 shows two sets of the two CCDs described, although more or less sets may be used, in accordance with one aspect of the subject technology. For example, front CCDs 204a and 206a may receive light flashes generated by optical fiber cube 202 directed to the front ends of the fibers. Back CCDs 204b and 206b may also receive the light flashes generated by optical fiber cube 202 directed to the back ends of the fibers. According to one aspect of the subject technology, front CCDs 204a and 206a as well as back CCDs 204b and 206b may read out continuously. In one aspect of the subject technology, a CCD that reads out continuously may record and output one or more events, such as light flashes, without a triggering event after which readout happens, or an exposure period after which the CCD is read out. In another aspect of the subject technology, a CCD that reads out continuously may record and output one or more events, such as light flashes, without having to discern or separate each event from the next event. Front CCDs 204a and 206a may read out a first set of data to processor 214 and back CCDs 204b and 206b may read out a second set of data to processor 214. The first set of data, for example, corresponds to data recorded by the front CCDs 204a and 206a, while the second set of data corresponds to data recorded by the back CCDs 204b and 206b. Processor 214 may be coupled to front CCDs 204a and 206a as well as back CCDs 204b and 206b.

Figure 3:
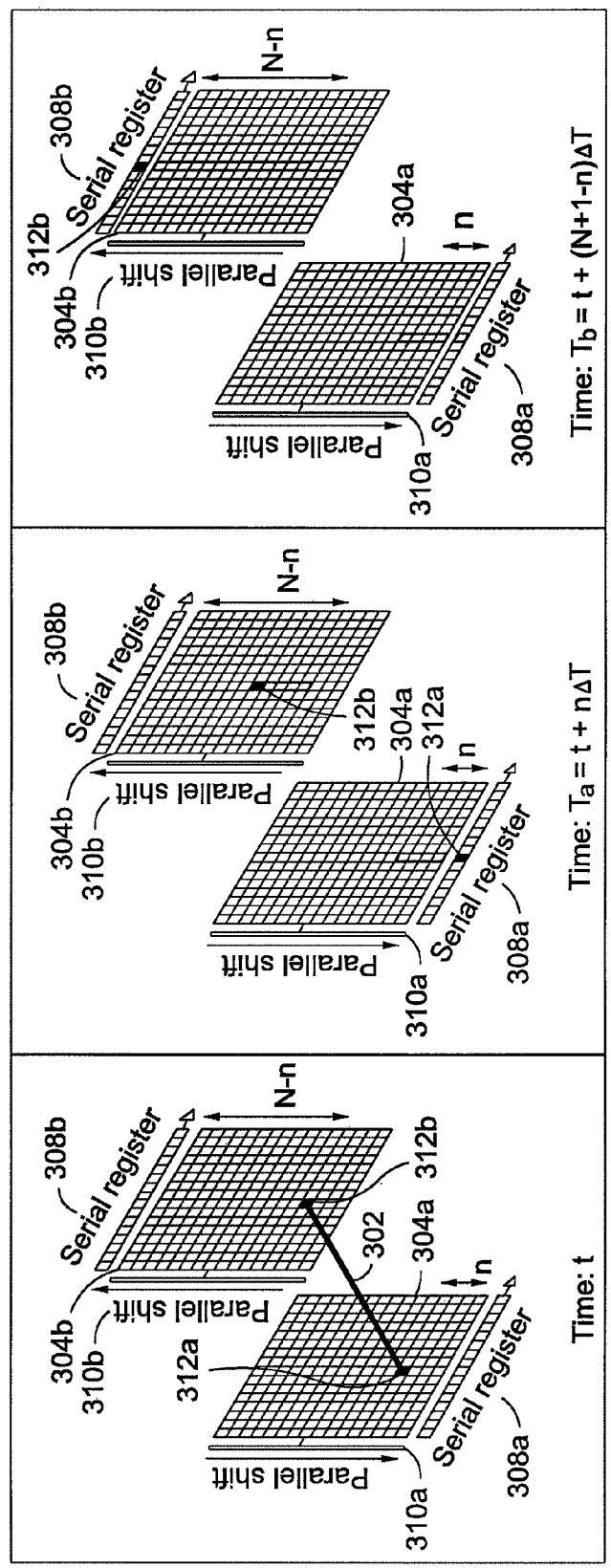
FIGS. 3A, 3B and 3C illustrate an example of a two CCD readout scheme, in accordance with one aspect of the subject technology.

FIGS. 3A, 3B and 3C illustrate an example of a two CCD readout scheme, in accordance with one aspect of the subject technology.

Front CCD 304a may comprise serial register 308a and parallel shifter 310a. Back CCD 304b may comprise serial register 308b and parallel shifter 310b. Light produced from fiber 302 may be received by front CCD 304a as light packet 312a (e.g., a charge packet recorded by front CCD 304a) and also by back CCD 304b as light packet 312b (e.g., a charge packet recorded by back CCD 304b). Front CCD 304a or back CCD 304b may comprise N total number of rows, with n indicating the row of front CCD 304a. In order for front CCD 304a or back CCD 304b to read out the recorded light packets 312a or 312b, each row of the CCDs may be shifted by parallel shifters 310a or 310b along the direction of the respective parallel shifts, as shown in FIGS. 3A, 3B and 3C, towards serial register 308a or 308b respectively, upon which the light packets of the row may be read out, for example, by processor 214 of FIG. 2. In accordance with one aspect of the subject technology, front CCD 304a and back CCD 304b may read out continuously. The time interval between parallel shifts may be represented by $\Delta T$.

One approach is described below as to how to determine whether light packet 312a in a pixel of front CCD 304a that arrived at serial register 308a (via parallel shift) at clock cycle n (with each clock cycle corresponding to a parallel shift) originated in row n at time t=0, or in row n−1 at t=1 cycle, or in row n−2 at t=2 cycles, . . . , or in row 1 at t=n−1 cycles. According to one aspect of the subject technology, back CCD 304b, which records, on average, half of the light generated along fiber 302, may have its parallel shift of parallel shifter 310b opposite in direction to that of the parallel shift of parallel shifter 310a, as shown in FIGS. 3A, 3B and 3C. Note that the resolution of the above ambiguity using this two CCD readout scheme involves the understanding that a light packet 312a that arrives later but closer to serial register 308a of front CCD 304a takes a longer time to arrive at serial register 308b of back CCD 304b than another light packet that arrives earlier in time but farther from serial register 308a.

Consider, as shown in FIG. 3A, a light packet that is generated by fiber 302 at as yet unknown time t (relative to a CCD synchronization signal) at as yet unknown row n (counting from 1) from the front serial register 308a. On average half of the light packet may travel towards and be registered by front CCD 304a as light packet 312a and half may travel towards and be registered by back CCD 304b as light packet 312b. The number of rows between light packet 312b and the back serial register 308b is N−n.

According to one aspect of the subject technology, light packet 312a arrives at serial register 308a at a known time $T_a$, as shown in FIG. 3B; this time is related to the unknown time and position of the event by $T_a$=t+n$\Delta T$. As shown in FIG. 3C, light packet 312b arrives at serial register 308b at a known time $T_b$=t+(N+1−n)$\Delta T$. Accepting, for the time being, that one knows that the times $T_a$ and $T_b$ are associated with the same event, the two equations relating these times to the two unknowns t and n can be solved to obtain:

$$t = \frac{1}{2}(T_a + T_b - (N+1)\Delta T) \quad (1)$$

$$n = \frac{1}{2}\left(\frac{T_a - T_b}{\Delta T} + N + 1\right) \quad (2)$$

In one aspect, the time measurements are not continuous and one does not know the times t, $T_a$ and $T_b$ to better than $\Delta T$, the time interval between parallel shifts. Hence, it is more appropriate to express those times in integral multiples of $\Delta T$: t=$n_0\Delta T$, $T_a$=$n_a\Delta T$ and $T_b$=$n_b\Delta T$. In terms of these clock cycle numbers the clock cycle number $n_0$ and the row n at which the event arrived are given by:

$$n_0 = \frac{1}{2}(n_a + n_b - N - 1) \quad (3)$$

$$n = \frac{1}{2}(n_a - n_b + N + 1) \quad (4)$$

Next, the question of which clock cycles recorded in back CCD 304b is associated with the clock cycles recorded in front CCD 304a may be answered. In accordance with one aspect of the subject technology, the first association is the column number of front CCD 304a or back CCD 304b. For pixels belonging to the same column, the time separation between the back CCD 304b event and the front CCD 304a event must be less than a full frame time (i.e. N cycles). According to one aspect of the subject technology, if only one light packet is above this threshold per column per frame time, then there is no ambiguity.

However, if more than one row (for the same column) receives a light packet within a time interval that is less than N clock cycles, then there is the potential for ambiguity. According to one aspect of the subject technology, one solution is to rely on the intensity of the collected light packet. Since, on average, half of the light goes to the front of the fiber and half to the back of the fiber, the front and back light packets corresponding to the same event should be equal, within statistics. If this solution fails, that is if the statistics are low enough, or the signals in the same column for the two different events are comparable, another solution is to match the patterns, in accordance with one aspect of the subject technology. For example, in the application of tracking radioactive sources, the events of interest are tracks that cover multiple pixels. As shown in FIG. 1B, the pixel pattern created by light track 104a should match the pixel pattern created by light track 104b. Similarly, the pixel pattern created by light track 106a should match the pixel pattern created by light track 106b. The matching pixel patterns could be used to associate the back and front clock cycles, in accordance with one aspect of the subject technology.

If the event rate is very high there may be some events for which association is not possible; such events may be discarded. The rate at which this kind of a loss becomes significant may depend on the average number of pixels that are lit per event. For example, roughly 10 pixels per electron track can be expected for a gamma camera, so an event rate of 200 or more per frame may result in certain overlap for some portion of the light tracks. According to one aspect of the subject technology, the rate may be increased using multiple CCDs per face (e.g., mosaicing).

To illustrate the application of equations 3 and 4 and how ambiguities may arise and be resolved, consider a simplified example of a fiber block comprising 10 fibers, one above the other, being imaged on one end (e.g., the front end) by a one-column front CCD with 10 pixels that match the 10 fibers, and a corresponding one-column back CCD to image the back ends of the fibers. The front CCD and the back CCD may start shifting the pixels at the same time, in opposite directions, as discussed above, in accordance with one aspect of the subject technology. The following read out tables illustrates various examples of this operation, in accordance with one aspect of the subject technology.

Example of one fiber hit (e.g., a fiber generating a light flash towards the front CCD and the back CCD):

|  | Shift number | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| front CCD pixel value (intensity) | 0 | 0 | 0 | 0 | 0 | 101 | 0 | 0 | 0 | 0 | 0 | 0 |
| back CCD pixel value (intensity) | 0 | 0 | 0 | 0 | 105 | 0 | 0 | 0 | 0 | 0 | 0 | 0 |

Because each CCD column contains only one light packet and the light packets are similar in intensity (101 and 105), the event that resulted in the light packet observed in the 6th pixel shift in the front CCD ($n_a=6$) may be the same event that resulted in the light packet observed in the 5th pixel shift in the back CCD ($n_b=5$). Using equations 3 and 4 to solve for $n_0$ (the time, in shift cycles, at which the fiber was hit) and n (the fiber number, counting from 1, from the bottom of the front CCD):

$$n_a = 6 \left. \atop n_b = 5 \right\} \begin{array}{l} n_o = 0.5 * (6 + 5 - 11) = 0 \\ n = 0.5 * (6 - 5 + 11) = 6 \end{array}$$

The solutions to equations 3 and 4 indicate that fiber 6 was hit at the beginning of the frame readout.

Example of two fibers hit, with the hits yielding different intensities of light:

|  | Shift number | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| front CCD pixel value (intensity) | 0 | 0 | 0 | 0 | 0 | 101 | 0 | 56 | 0 | 0 | 0 | 0 |
| back CCD pixel value (intensity) | 0 | 0 | 0 | 0 | 105 | 0 | 52 | 0 | 0 | 0 | 0 | 0 |

Since, on average, the amount of light traveling to one fiber end is approximately equal to the amount of light travelling to the other fiber end, the above measurements indicate that the pixel measured on the 6th shift on the front CCD ($n_a=6$, intensity value=101) should correspond to the same fiber event registered on the 5th shift on the back CCD ($n_b=5$, intensity value=105). Using equations 3 and 4, the time and location of the fiber may be solved by:

$$n_a = 6 \left. \atop n_b = 5 \right\} \begin{array}{l} n_o = 0.5 * (6 + 5 - 11) = 0 \\ n = 0.5 * (6 - 5 + 11) = 6 \end{array}$$

The same table above also indicates that the pixel measured on the 8th shift on the front CCD ($n_a=8$, intensity value=56) should correspond to the same fiber event registered on the 7th shift on the back CCD ($n_b=7$, intensity value=52). Using equations 3 and 4, the time and location of the fiber may be solved by:

$$n_a = 8 \left. \atop n_b = 7 \right\} \begin{array}{l} n_o = 0.5 * (8 + 7 - 11) = 2 \\ n = 0.5 * (8 - 7 + 11) = 6 \end{array}$$

Example of two fibers hit, with the hits yielding comparable intensities of light:

|  | Shift number | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| front CCD pixel value (intensity) | 0 | 0 | 0 | 0 | 0 | 101 | 0 | 100 | 0 | 0 | 0 | 0 |
| back CCD pixel value (intensity) | 0 | 0 | 0 | 0 | 105 | 0 | 103 | 0 | 0 | 0 | 0 | 0 |

Looking at the intensity values in the above table, it may not be possible to tell which pixel shifts in the front CCD correspond to the ones in the back CCD. Thus, two combinations may be possible. One possibility may result in:

$$n_a = 6 \left. \atop n_b = 5 \right\} \begin{array}{l} n_o = 0.5 * (6 + 5 - 11) = 0 \\ n = 0.5 * (6 - 5 + 11) = 6 \end{array}$$

and $$n_a = 8 \left. \atop n_b = 7 \right\} \begin{array}{l} n_o = 0.5 * (8 + 7 - 11) = 2 \\ n = 0.5 * (8 - 7 + 11) = 6 \end{array}$$

Another possibility may result in:

$$n_a = 6 \left. \atop n_b = 7 \right\} \begin{array}{l} n_o = 0.5 * (6 + 7 - 11) = 1 \\ n = 0.5 * (6 - 7 + 11) = 5 \end{array}$$

and $$n_a = 8 \left. \atop n_b = 5 \right\} \begin{array}{l} n_o = 0.5 * (8 + 5 - 11) = 1 \\ n = 0.5 * (8 - 5 + 11) = 7 \end{array}$$

Figure 4:
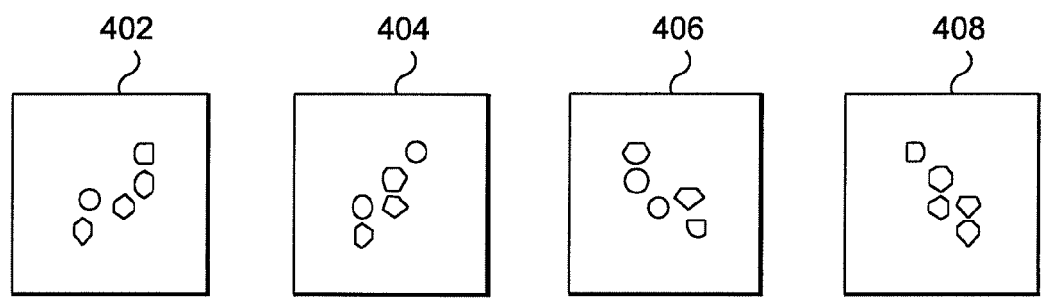
FIG. 4 illustrates examples of recorded light patterns, in accordance with one aspect of the subject technology.

In this example, all four intensity values have a similar magnitude so the ambiguous results cannot be resolved by comparing the intensity values. According to another aspect of the subject technology, a method to resolve the ambiguities include examining the clusters of hits (e.g., light pattern) surrounding each fiber hit. This may entail using a two-dimensional CCD. In practical cases of interest, an electron track or a shape is being imaged, and the event may produce light flashes using multiple adjacent fibers. These fiber clusters that have been hit may produce distinctive shapes or slopes. The image from one cluster of hits recorded by the front CCD should match the image recorded by the back CCD, in accordance with one aspect of the subject technology. Thus, assuming a two-dimensional CCD, the situation presented in the above example may be illustrated by the light patterns shown in FIG. 4.

Light patterns 402 and 404 may indicate the light patterns recorded by the front CCD and light patterns 406 and 408 may indicate the light patterns recorded by the back CCD. The ambiguity presented in the above example may be solved by matching the shapes and slopes of the light patterns recorded by the front CCD to the light patterns recorded by the back CCD. Thus, light pattern 402 is associated with light pattern 406 and light pattern 404 is associated with light pattern 408.

Figure 5:
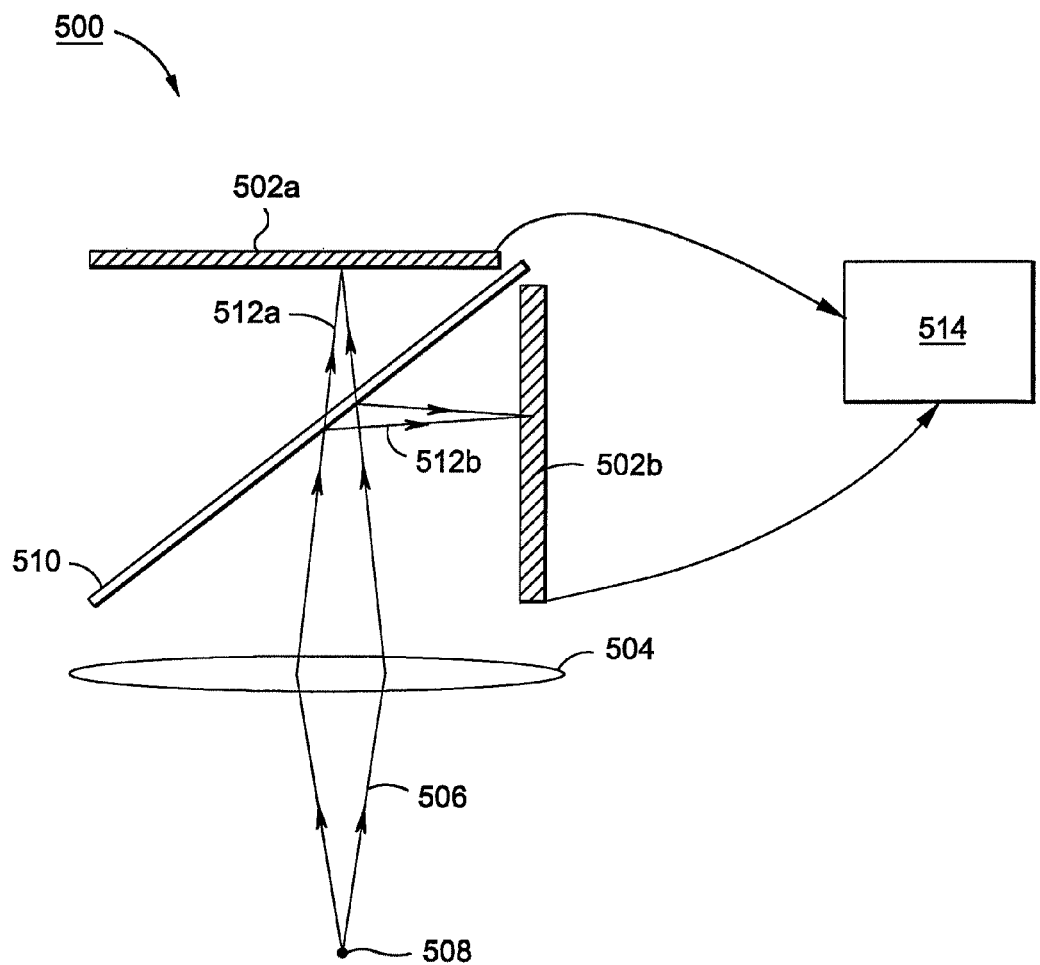
FIG. 5 illustrates an example of an imaging system for determining the time and location of light flashes, in accordance with one aspect of the subject technology.

FIG. 5 illustrates an example of an imaging system 500 for determining the time and location of light flashes, in accordance with one aspect of the subject technology The readout scheme discussed above may be adapted to other imaging applications such as 2D imaging applications, in accordance with one aspect of the subject technology. For example, optical components may be used to direct light flash 506 generated from light source 508 to a first CCD 502a and a second CCD 502b, in addition to transporting light flashes along the fibers as discussed above. Light source 508, for example, may be an astrophysical source, or scintillation produced by x-ray imaging. Light source 508 can come from any number of sources as long as the yield per light flash per pixel is sufficient to allow splitting approximately half of its photons to each of the two CCDs. Focusing element 504 may be a lens or any other suitable optical component to direct light flash 506 towards optical component 510. Optical component 510, for example, may be a partially reflecting mirror, a beamsplitter, or any other suitable optical component to direct approximately half of light flash 506 towards first CCD 502a as light flash 512a, and approximately half of light flash 506 towards second CCD 502b as light flash 512b.

First CCD 502a may comprise a first parallel shift. Second CCD 502b may comprise a second parallel shift, which is opposite in direction to the first parallel shift. Thus, first CCD 502a and second CCD 502b may be scanned in opposite directions (into and out of the page). First CCD 502a may read out a first set of data from light flash 512a and second CCD 502b may read out a second set of data from light flash 512b. The first set of data, for example, corresponds to data recorded by the first CCD 502a, while the second set of data corresponds to data recorded by the second CCD 502b. Processor 514, which may be coupled to first CCD 502a and second CCD 502b, may determine the time and location of light flash 506 as discussed above, in accordance with one aspect of the subject technology. Thus, imaging system 500 may be useful in a wide variety of applications where continuous readout may be desirable or necessary, for example, in applications where the light source is pulsed or random. In accordance with one aspect of the disclosure, the subject technology is related to CCDs, imaging, optical timing, and light pulse sensing. In another aspect of the disclosure, the subject technology may be used in various markets, which may include markets involving advanced sensors and advanced software.

Figure 6:
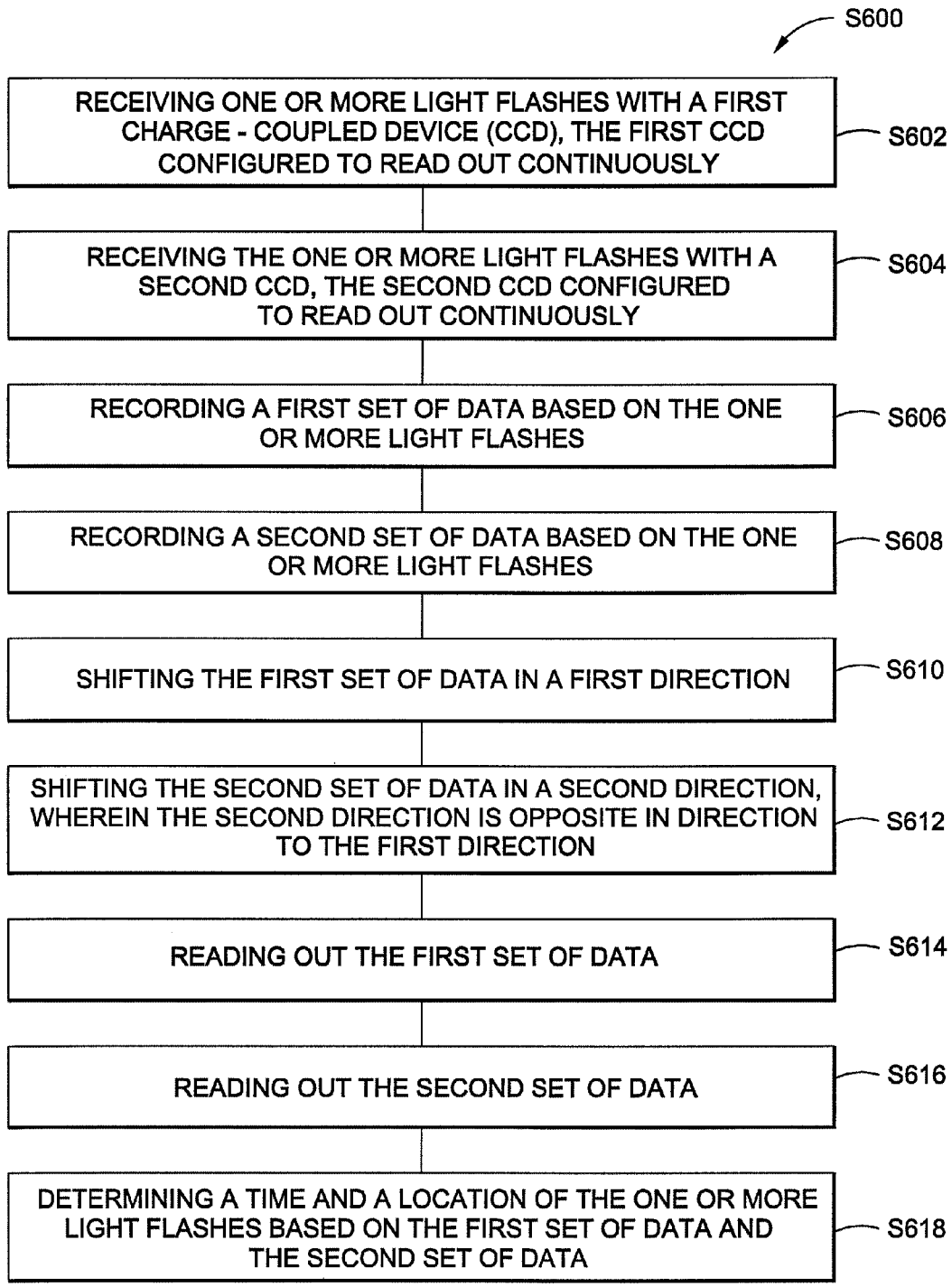
FIG. 6 illustrates an example of a method for determining the time and location of light flashes, in accordance with one aspect of the subject technology.

FIG. 6 illustrates an example of a method S600 for determining the time and location of light flashes, in accordance with one aspect of the subject technology.

In accordance with one aspect of the disclosure, method S600 comprises receiving one or more light flashes with a first charge-coupled device (CCD), the first CCD configured to read out continuously (S602). The method also comprises receiving the one or more light flashes with a second CCD, the second CCD configured to read out continuously (S604). Method S600 also comprises recording a first set of data based on the one or more light flashes (S606) and recording a second set of data based on the one or more light flashes (S608). Method S600 also comprises shifting the first set of data in a first direction (S610) and shifting the second set of data in a second direction, wherein the second direction is opposite in direction to the first direction (S612). Method S600 also comprises reading out the first set of data (S614) and reading out the second set of data (S616). Method S600 also comprises determining a time and a location of the one or more light flashes based on the first set of data and the second set of data (S618).

Figure 7:
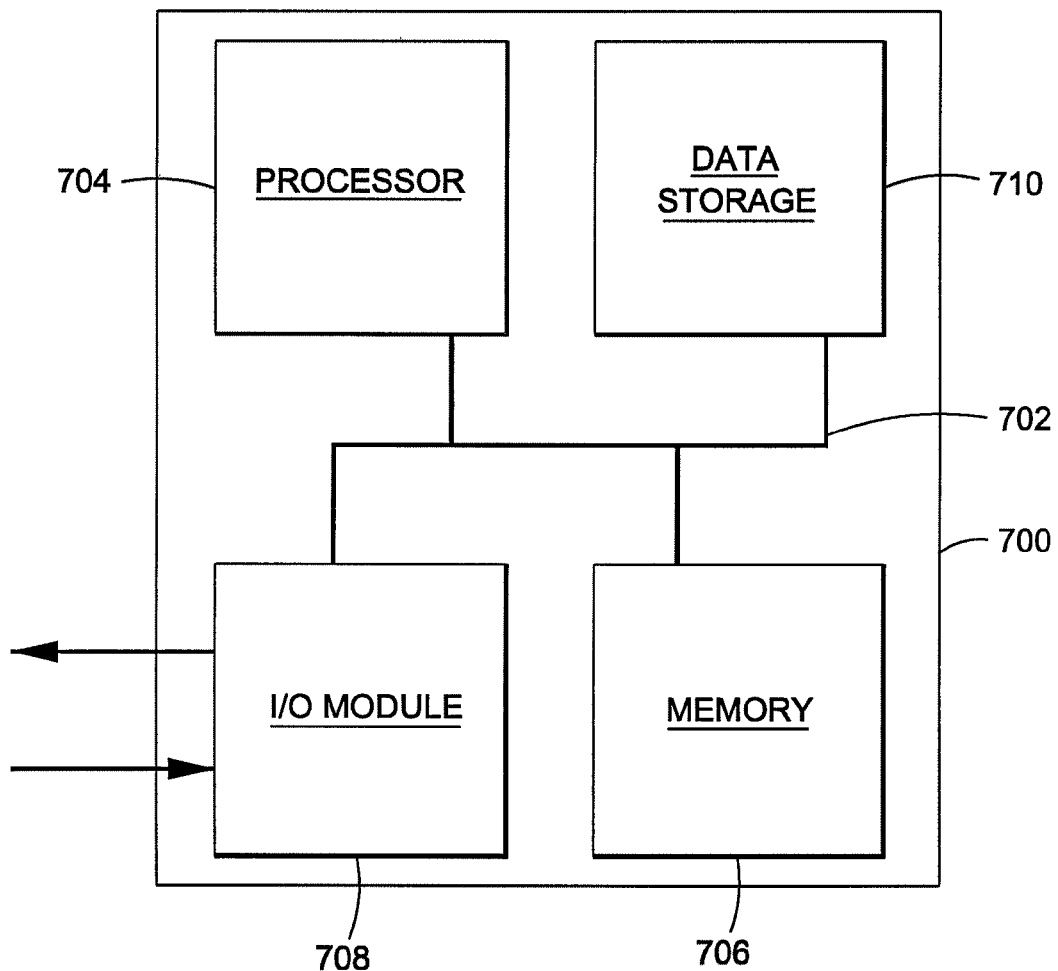
FIG. 7 is a block diagram illustrating an example of a computer system, in accordance with one aspect of the subject technology.

FIG. 7 is a block diagram illustrating an example of a computer system, in accordance with one aspect of the subject technology. In one aspect, a computer system 700 may be utilized to implement an aspect of the subject technology. Computer system 700 includes a bus 702 or other communication mechanism for communicating information, and a processor 704 coupled with bus 702 for processing information. Computer system 700 also includes a memory 706, such as a random access memory ("RAM") or other dynamic storage device, coupled to bus 702 for storing information and instructions to be executed by processor 704. Memory 706 may also be used for storing temporary variables or other intermediate information during execution of instructions by processor 704. Computer system 700 further includes a data storage device 710, such as a magnetic disk or optical disk, coupled to bus 702 for storing information and instructions.

Computer system 700 may be coupled via I/O module 708 to a display device (not illustrated), such as a cathode ray tube ("CRT") or liquid crystal display ("LCD") for displaying information to a computer user. An input device, such as, for example, a keyboard or a mouse may also be coupled to computer system 700 via I/O module 708 for communicating information and command selections to processor 704. In one aspect, processor 214 of FIG. 2 or processor 514 of FIG. 5 may be represented by computer system 700. In another aspect, processor 214 of FIG. 2 or processor 514 of FIG. 5 may be represented by processor 704.

According to one aspect of the subject technology, determining the time and location of light flashes is performed by a computer system 700 in response to processor 704 executing one or more sequences of one or more instructions contained in memory 706. Such instructions may be read into memory 706 from another machine-readable medium, such as data storage device 710. Execution of the sequences of instructions contained in main memory 706 causes processor 704 to perform the process steps described herein. One or more processors in a multi-processing arrangement may also be employed to execute the sequences of instructions contained in memory 706. In other aspects, hard-wired circuitry may be used in place of or in combination with software instructions to implement various embodiments of the subject technology. Thus, aspects of the subject technology are not limited to any specific combination of hardware circuitry and software.

The term "machine-readable medium" as used herein refers to any medium that participates in providing instructions to processor 704 for execution. Such a medium may take many forms, including, but not limited to, non-volatile media, volatile media, and transmission media. Non-volatile media include, for example, optical or magnetic disks, such as data storage device 710. Volatile media include dynamic memory, such as memory 706. Transmission media include coaxial cables, copper wire, and optical fibers, including the wires that comprise bus 702. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy' presented.

The word "exemplary" is used herein to mean "serving as an example, instance, or illustration." Any embodiment described herein as "exemplary" is not necessarily to be construed as preferred or advantageous over other embodiments.

The description of the invention is provided to enable any person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

Terms such as "top," "bottom," "front," "back" and the like as used in this disclosure should be understood as referring to an arbitrary frame of reference, rather than to the ordinary gravitational frame of reference. Thus, a top surface, a bottom surface, a front surface, and a back surface may extend upwardly, downwardly, diagonally, or horizontally in a gravitational frame of reference.

A reference to an element in the singular is not intended to mean "one and only one" unless specifically stated, but rather "one or more." Underlined and/or italicized headings and subheadings are used for convenience only, do not limit the invention, and are not referred to in connection with the interpretation of the description of the invention. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An imaging system for determining the time and location of light flashes, comprising:
    a first charge-coupled device (CCD) configured to receive one or more light flashes, record a first set of data based on the one or more light flashes, shift the first set of data in a first direction, and read out the first set of data, wherein the first CCD is further configured to read out continuously;
    a second CCD configured to receive the one or more light flashes, record a second set of data based on the one or more light flashes, shift the second set of data in a second direction, and read out the second set of data, wherein the second CCD is further configured to read out continuously, and wherein the second direction is opposite in direction to the first direction;
    a processor coupled to the first CCD and the second CCD, the processor configured to determine a time and a location of the one or more light flashes based on the first set of data, the second set of data, a time of outputting the first set of data in the first direction, and a time of outputting the second set of data in the second direction.

2. The imaging system of claim 1, further comprising a sensor configured to detect radioactive sources, the sensor comprising a block of crossed scintillating optical fibers configured to deliver the one or more light flashes based on the radioactive sources.

3. The imaging system of claim 2, further comprising:
    a third CCD configured to receive the one or more light flashes, record a third set of data based on the one or more light flashes, shift the third set of data in a third direction, and read out the third set of data, wherein the third CCD is further configured to read out continuously; and
    a fourth CCD configured to receive the one or more light flashes, record a fourth set of data based on the one or more light flashes, shift the fourth set of data in a fourth direction, and read out the fourth set of data, wherein the fourth CCD is further configured to read out continuously, and wherein the fourth direction is opposite in direction to the third direction,
    wherein the processor is coupled to the third CCD and the fourth CCD, the processor further configured to determine the time and the location of the one or more light flashes based on the third set of data and the fourth set of data.

4. The imaging system of claim 1, further comprising an optical component configured to direct the one or more light flashes to the first CCD and the second CCD.

5. The imaging system of claim 4, wherein the optical component comprises a partially reflecting mirror, the partially reflecting mirror configured to direct approximately half of the one or more light flashes to the first CCD and approximately half of the one or more light flashes to the second CCD.

6. The imaging system of claim 1, wherein the first CCD comprises a first parallel shifter configured to shift the first set of data in the first direction, wherein the second CCD comprises a second parallel shifter configured to shift the second set of data in the second direction, and wherein the processor is further configured to determine the time and the location of each of the one or more light flashes.

7. The imaging system of claim 1, wherein the time of the one or more light flashes according to parallel shift cycles of the first CCD and the second CCD is given by $n_0$, and wherein $n_0$ is approximately equal to $$\frac{1}{2}(n_a + n_b - N - 1),$$

where $n_a$ is the time of outputting the first set of data according to parallel shift cycles of the first CCD, $n_b$ is the time of outputting the second set of data according to parallel shift cycles of the second CCD, and N is the total number of rows of the first CCD.

8. The imaging system of claim 1, wherein the location of the one or more light flashes according to rows of the first CCD is given by n, and wherein n is approximately equal to $$\frac{1}{2}(n_a - n_b + N + 1),$$

where $n_a$ is the time of outputting the first set of data according to parallel shift cycles of the first CCD, $n_b$ is the time of outputting the second set of data according to parallel shift cycles of the second CCD, and N is the total number of rows of the first CCD.

9. A method for determining the time and location of light flashes, comprising:
- receiving one or more light flashes with a first charge-coupled device (CCD), the first CCD configured to read out continuously;
- receiving the one or more light flashes with a second CCD, the second CCD configured to read out continuously;
- recording a first set of data based on the one or more light flashes;
- recording a second set of data based on the one or more light flashes;
- shifting the first set of data in a first direction;
- shifting the second set of data in a second direction, wherein the second direction is opposite in direction to the first direction;
- reading out the first set of data;
- reading out the second set of data; and
- determining a time and a location of the one or more light flashes based on the first set of data, the second set of data, a time of outputting the first set of data in the first direction, and a time of outputting the second set of data in the second direction.

10. The method of claim 9, further comprising:
- detecting radioactive sources; and
- delivering the one or more light flashes based on the radioactive sources.

11. The method of claim 10, further comprising:
- receiving the one or more light flashes with a third CCD, the third CCD configured to read out continuously;
- receiving the one or more light flashes with a fourth CCD, the fourth CCD configured to read out continuously;
- recording a third set of data based on the one or more light flashes;
- recording a fourth set of data based on the one or more light flashes;
- shifting the third set of data in a third direction;
- shifting the fourth set of data in a fourth direction, wherein the fourth direction is opposite in direction to the third direction;
- reading out the third set of data;
- reading out the fourth set of data; and
- determining the time and the location of the one or more light flashes based on the third set of data and the fourth set of data.

12. The method of claim 9, further comprising directing the one or more light flashes to the first CCD and the second CCD.

13. The method of claim 12, further comprising:
- directing approximately half of the one or more light flashes to the first CCD and approximately half of the one or more light flashes to the second CCD; and
- determining the time and the location of each of the one or more light flashes.

14. The method of claim 9, wherein the time of the one or more light flashes according to parallel shift cycles of the first CCD and the second CCD is given by $n_0$, and wherein $n_0$ is approximately equal to $$\frac{1}{2}(n_a + n_b - N - 1),$$

where $n_a$ is the time of outputting the first set of data according to parallel shift cycles of the first CCD,
$n_b$ is the time of outputting the second set of data according to parallel shift cycles of the second CCD, and
N is the total number of rows of the first CCD.

15. The method of claim 9, wherein the location of the one or more light flashes according to rows of the first CCD is given by n, and wherein n is approximately equal to $$\frac{1}{2}(n_a - n_b + N + 1),$$

where $n_a$ is the time of outputting the first set of data according to parallel shift cycles of the first CCD,
$n_b$ is the time of outputting the second set of data according to parallel shift cycles of the second CCD, and
N is the total number of rows of the first CCD.

16. An imaging system for determining the time and location of light flashes, comprising:
- a first charge-coupled device (CCD) configured to receive one or more light flashes, record a first set of data based on the one or more light flashes, shift the first set of data in a first direction, and read out the first set of data;
- a second CCD configured to receive the one or more light flashes, record a second set of data based on the one or more light flashes, shift the second set of data in a second direction, and read out the second set of data, wherein the second direction is opposite in direction to the first direction;
- a processor coupled to the first CCD and the second CCD, the processor configured to determine a time and a location of the one or more light flashes based on the first set of data, the second set of data, a time of outputting the first set of data in the first direction, and a time of outputting the second set of data in the second direction.

17. The imaging system of claim 16, further comprising a sensor configured to detect radioactive sources, the sensor comprising a block of crossed scintillating optical fibers configured to deliver the one or more light flashes based on the radioactive sources.

18. The imaging system of claim 17, further comprising:
- a third CCD configured to receive the one or more light flashes, record a third set of data based on the one or more light flashes, shift the third set of data in a third direction, and read out the third set of data; and
- a fourth CCD configured to receive the one or more light flashes, record a fourth set of data based on the one or more light flashes, shift the fourth set of data in a fourth direction, and read out the fourth set of data, wherein the fourth direction is opposite in direction to the third direction, and
- wherein the processor is coupled to the third CCD and the fourth CCD, the processor further configured to determine the time and the location of the one or more light flashes based on the third set of data and the fourth set of data.

19. The imaging system of claim 16, further comprising an optical component configured to direct the one or more light flashes to the first CCD and the second CCD.

20. The imaging system of claim 19, wherein the optical component comprises a partially reflecting mirror, the partially reflecting mirror configured to direct approximately half of the one or more light flashes to the first CCD and approximately half of the one or more light flashes to the second CCD.

* * * * *